May 22, 1945.  H. R. McVICAR  2,376,609
TRACTOR OPERATED DISK HARROW
Filed July 15, 1940   3 Sheets-Sheet 1

INVENTOR.
Harold R. McVicar
BY Harry P. Canfield
ATTORNEY.

May 22, 1945.  H. R. McVICAR  2,376,609
TRACTOR OPERATED DISK HARROW
Filed July 15, 1940  3 Sheets-Sheet 2

INVENTOR.
Harold R. McVicar
BY Harry P. Caufield
ATTORNEY.

May 22, 1945.　　　H. R. McVICAR　　　2,376,609
TRACTOR OPERATED DISK HARROW
Filed July 15, 1940　　　3 Sheets-Sheet 3
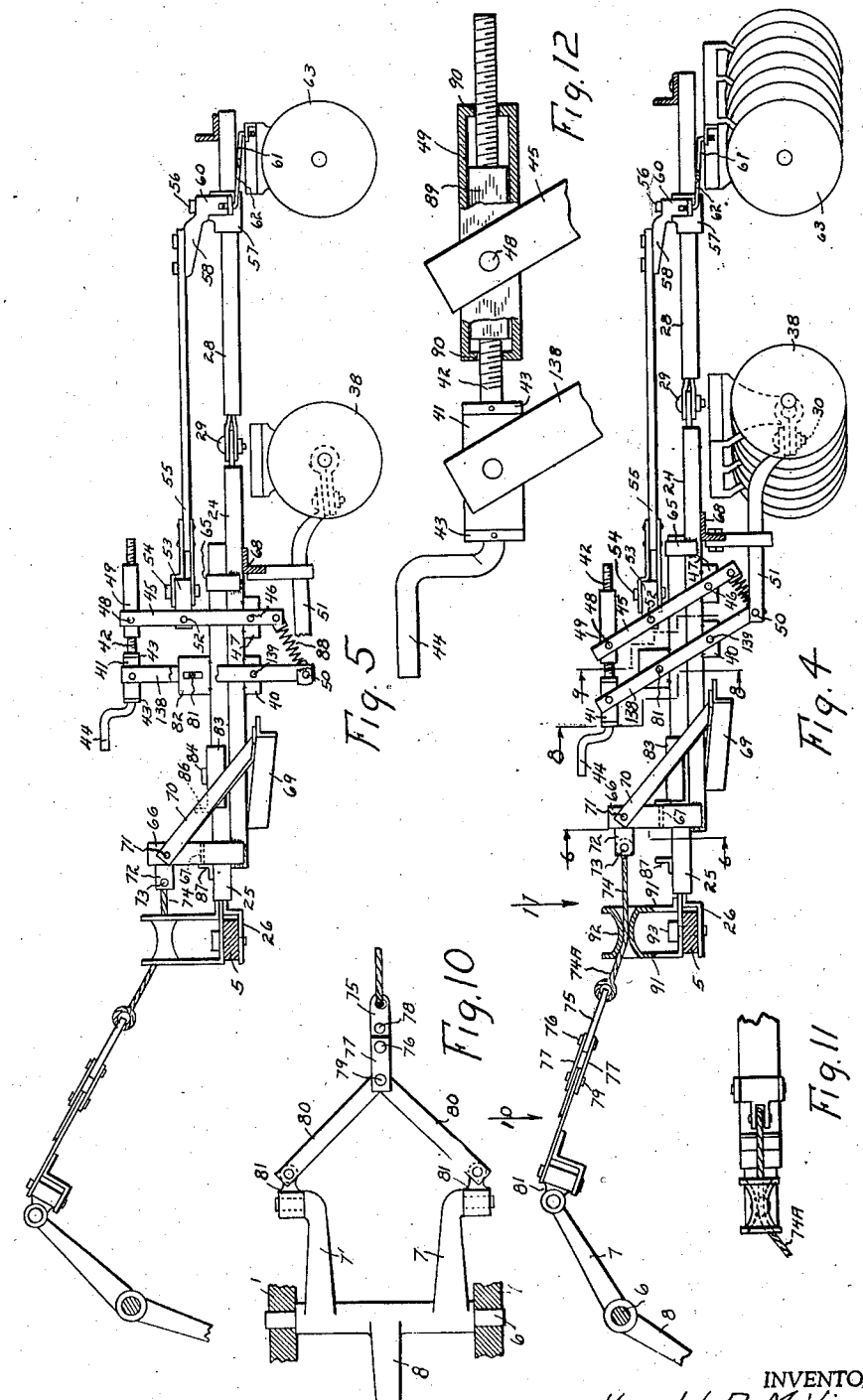
INVENTOR.
Harold R. McVicar
Harry P. Canfield
BY Patented May 22, 1945

2,376,609

UNITED STATES PATENT OFFICE 2,376,609

TRACTOR OPERATED DISK HARROW

Harold R. McVicar, Berea, Ohio, assignor to The Dunham Company, Berea, Ohio, a corporation of Ohio Application July 15, 1940, Serial No. 345,565

21 Claims. (Cl. 55—33)

This invention relates to agricultural implements of the disk harrow type, and to such implements arranged to be propelled as a unit, and also adjusted as to the working angle of the disks, by power.

It is well known practice to utilize the power of a tractor for the forward propulsion and draft of agricultural implements; and it has been also proposed to provide the tractor with mechanism for supplying engine power to raise and lower the draft elements of ground working tools of the implement to adjust the depth at which they work in the soil.

According to the present invention I provide an agricultural implement of the disk harrow type arranged to be propelled by a tractor and arranged to be operated by auxiliary power to effect an improved operation of the harrow; and preferably I utilize for this auxiliary power, the aforesaid raising and lowering mechanism, by applying it in a new manner although as will become apparent hereinafter, I may operate the harrow by a source of auxiliary power located elsewhere, for example on the harrow itself.

Disk harrows comprise, in general, gangs of rotary disks mounted for horizontal pivoting movement on a main frame, by which the working angle of the disks relative to the forward direction of travel may be changed; and, mechanism to adjust the said angle in accordance with soil conditions; or to set the disks so as to be without angle when traveling toward and from the field to be worked and when making turns at the end of the field, etc.

The disk gangs of the harrow herein to be described are mounted on a main frame so that when the forward draft of the tractor is applied to the frame, the disk gangs automatically turn to a predetermined working angle, this being effected by a suitable location of the gang pivots, and by the drag of the disks when propelled forwardly; and mechanism is provided associated with the aforesaid implement-depth-adjusting power-mechanism of the tractor, and controlled manually, by which the disk gangs may be turned to a lesser angle, or to zero angle, at any time during forward propulsion of the implement as a whole; and by which the gangs may be released and permitted to return automatically to their predetermined working angle, by forward draft of the implement as a whole.

The disk harrow of the present invention may comprise both forward and rearward gangs, and in such cases improved means is provided by which the rearward gangs are caused automatically to trail those of the forward gangs when the implement is propelled along a curved direction of forward travel, whereby the disks of all of the gangs are maintained at the correct predetermined working angle, whether the forward direction of travel is straight or curved.

While my invention has particular advantages when applied to a disk harrow comprising two forward disk gangs and two rearward disk gangs, it may be practiced also with one forward gang alone or with two forward gangs alone, or with one forward and one rearward gang.

While the foregoing described mode of operation is one preferred, in some cases it may be desirable to arrange the disk harrow mechanism so that the disk gangs tend to move automatically to the no-angle or non-working angle position and the aforesaid auxiliary power mechanism of the tractor may be utilized to effect movement of the disk gangs to the angle or working position.

It is among the objects of the present invention:

To provide generally an improved agricultural implement of the disk harrow type;

To provide an agricultural implement of the disk harrow type having improved means for moving the disks thereof to desired angular positions relative to the direction of travel;

To provide an agricultural implement of the disk harrow type provided with means operable by the power of a tractor to propel the implement over the ground, and also to change the angle of the disks with respect to the direction of forward travel;

To provide an agricultural implement of the disk harrow type having gangs of disks pivotally mounted so that upon forward propulsion of the implement by a tractor they tend to take up positions which dispose the disks at an angle to the direction of travel, and having means associated therewith by which, during the propulsion of the implement over the ground, auxiliary power from the tractor may be optionally used to move the disk gangs to dispose the disks thereof substantially without angle;

To provide an implement of the tandem disk harrow type comprising forward and rearward disk gangs, and provided with improved means for causing the rearward disks to accurately split the tracks of the forward disks and maintain unchanged the working angle thereof with respect to the direction of travel when the implement moves on a curved forward course;

To provide an agricultural implement of the disk harrow type having improved means by which it may be propelled over the ground to work it, and by which an auxiliary source of power may also be applied to the disk gangs of the implement to change the angle of the disks thereof with respect to the forward direction of travel.

To provide an agricultural implement of the disk harrow type provided with a main hitch for connection to the draw bar of a tractor, and provided with an auxiliary hitch adapted to be connected to an auxiliary source of power, and the implement comprising pivoted gangs or disks pivotally movable to angle ground-working position or to no-angle non-working position, and the mechanism being arranged so that the disc gangs tend automatically to move to one of said positions when the implement is propelled along the ground by the main hitch and auxiliary power supplied to the auxiliary hitch is utilized to move the gangs to the other position.

Other objects will be apparent to those skilled in the art to which my invention appertains.

My invention is fully disclosed in the following description taken in connection with the accompanying drawings, in which, Fig. 1 is a view in some respects diagrammatic, of a tractor of the type by which the implement embodying a part of my invention may be operated, and having an auxiliary power unit thereon;

Fig. 4 is a side elevational view of the parts of Fig. 2, with parts broken away for clearness;

Fig. 5 is a view similar to Fig. 4, but illustrating parts thereof after they have been moved to different operative positions by the auxiliary source of power on the tractor of Fig. 1;

Figure 8:
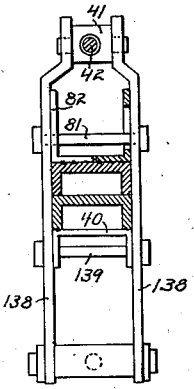
Figure 9:
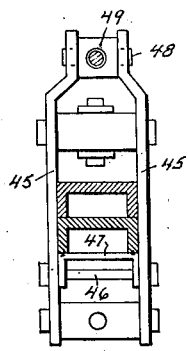

Figs. 8 and 9 are sectional views taken respectively from the planes 8 and 9 of Fig. 4;

Fig. 10 is a plan view of a forward part of Fig. 4;

Fig. 11 is a fragmentary view taken in the direction of the arrow 11 of Fig. 4;

Fig. 12 is a view to enlarged scale, partly broken away and partly in section of an adjusting mechanism shown in Figs. 4 and 5.

Figure 1:
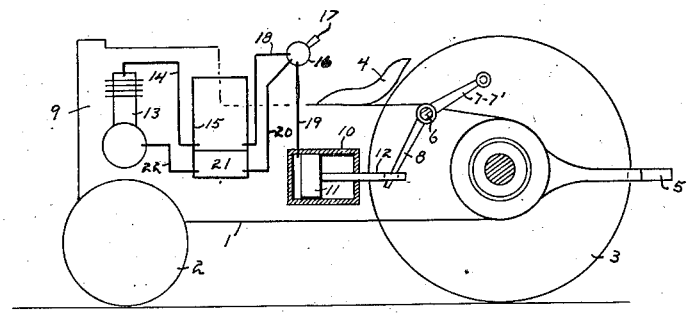
Figure 6:
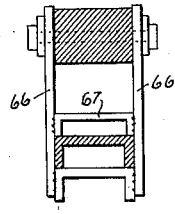
Fig. 6 is a sectional view taken from the plane 6 of Fig. 4.

Referring to the drawings, Fig. 1, I have illustrated therein, in diagrammatic form, a tractor of the type with which the implement of my invention may advantageously be associated. At 1 generally is the main frame, at 2 the forward wheels, and at 3, the rearward or traction wheels, only one of which is shown, and at 4 a driver's seat supported on the frame. A transverse draft bar 5 is connected to the main frame. At 6 is a shaft rotatable on the main frame and on which is oscillatably mounted a bell crank having bell crank arms 7 and 8, the arm 7 being in the form of a pair of arms 7 and 7' laterally spaced apart and shown in Fig. 10, to be referred to. The engine indicated at 9 transmits power to the rear wheels by the usual transmission not shown.

A hydraulic cylinder 10 is mounted on the main frame and has a piston 11 connected by a piston rod 12 to the arm 8 whereby reciprocations of the piston will oscillate the bell crank arms 8 and 7—7'. Liquid, such as oil, to move the piston 11 is supplied by a pressure pump indicated at 13, connected by a pressure line 14 to a reservoir 15. A manually operable valve 16 having a handle 17 to operate it is provided adjacent the driver's seat 4, and this valve may be of any well-known or suitable construction having the following mode of operation. When the handle 17 is moved in one direction, liquid under pressure from the reservoir 15 flows by a line 18 through the valve and by a line 19 to the cylinder 10 and propels the piston 11 forwardly. When the handle 17 is moved in the other direction, the liquid from the cylinder 10 exhausts by line 19 through the valve to a line 20, and thence to a sump 21, from which it may be pumped back by the pump 13 through a return line 22. Any suitable or known means not shown may be provided to prevent the pump from developing pressure above a desired maximal value.

Upon thus admitting pressure to the cylinder 10, the bell crank arms 7—7' will be moved counter clockwise, as viewed in Fig. 1, a predetermined amount, as will become clear; and upon relieving the cylinder pressure by the valve, draft on the arms 7—7' will return the piston to its original position.

The above described tractor and hydraulic auxiliary power unit, including the oscillatory shaft 6, et cetera, constitute no essential part of the present invention, and these parts may be variously constructed. For example, all of the parts of the auxiliary unit rearward of the reservoir 15 may be mounted on the implement itself to be described; or the power unit may be constructed as shown in the patent to Theophilus Brown, 2,197,848, April 23, 1940; and the auxiliary power unit has herein been shown in diagrammatic form as being illustrative of any construction and disposition of such parts; and in the other figures of the drawing, in which I have illustrated an agricultural implement of the disk harrow type, which may be operated by such a tractor and power unit, I have for sake of simplicity in the drawing, illustrated only the draw bar 5 and the supplemental draft elements 6, 7—7' and 8, and the hitch connections thereto.

Referring now to the other figures of the drawings, I have illustrated generally at 23 a forward main frame comprising a longitudinal beam 24, and a stub beam 25 slidable thereon or relative thereto, by means to be described, and the stub beam 25 on its forward end is provided with a draft hitch 26 by which the frame may, as a whole, be connected to the tractor draft bar 5 for forward propulsion, and the connection of the hitch 26 with the tractor draw bar serves to support the forward end of the harrow frame, a suitable distance from the ground.

At 27 is a rearward main frame comprising a longitudinal beam 28, and the two frames 23 and 27 are in general connected together intermediately thereof by a kingpin 29, connecting the beams 24 and 28. The forward frame 23 has pivotally connected thereto, at 30 and 31, a pair of laterally opposite disk gang frames 32 and 33; and the rearward frame 27 has pivotally connected thereto at 34 and 35 a pair of laterally opposite disk gang frames 36 and 37.

The forward disk gang frames 32 and 33 rotatably support gangs of forward disks 38 and 39 respectively; and the rearward disk frames rotatably support gangs of rearward disks 63 and 64 respectively.

The parts thus far described in themselves constitute no essential part of my invention, and may be constructed in any well known manner, and therefore have been briefly described above and illustrated in the drawings in simplified form, the reference characters 23 and 27 being utilized to designate the forward and rearward frames as inclusive of a number of bracing and other structural elements thereof for these reasons.

It is common practice in tandem disk harrows to provide means to adjustably vary the angular position of the disk frames to adjustably vary the working angle of the disks carried thereby with respect to the forward direction of travel, and the mechanism which I employ for this purpose will now be described.

A pair of levers 138—138 are pivotally mounted upon a bolt 139 of the main frame 23. Preferably two levers 138—138 are provided disposed on opposite sides of the beam 24 for rigidity and for facility of operation, and a channel-shaped piece 40 is secured to the underside of the beam 24, the bolt 139 projecting through the flanges of the channel. The levers 138—138 extend upwardly from their pivot 139 and are pivoted to the stub beam 25 by a bolt 81 mounted in the flanges of a channel piece 82 secured to the stub beam. Means will presently be described by which the beam 24 moves relative to the stub beam 25, or vice versa, whereby the levers 138—138 are rocked clockwise or counter-clockwise. Above the pivot 81 and at their upper ends the levers 138—138 are pivotally connected to a tubular bearing 41 through which extends a round rod 42 rotatable therein and anchored against longitudinal shifting therein by collars 43—43 secured to the rod, and the rod has a handle or crank 44 formed integrally therewith.

Another pair of levers 45—45 are provided pivotally mounted on a bolt 46 extending through the flanges of a channel piece 47 secured to the underside of the beam 24, and at the upper ends of the levers 45 they are pivotally connected as at 48 to opposite sides of a nut housing 49. The nut housing is tubular and rectangular in cross section and closed at both ends except for end openings 90—90; and a rectangular nut 89 is reciprocable without turning therein, into engagement at opposite ends with the closed ends of the housing. The outer end of the rod 42 is threaded, and meshed with the nut 89, and extends through the nut housing longitudinally and through the openings 90—90.

Upon rotating the rod 42 by the crank 44, the nut 89 will be propelled along the screw 42 to adjusted operative positions, to be described.

The levers 138—138 below their pivot 139 are pivotally connected at their lower ends as at 50 to longitudinally extending links 51—51, each of which connects at its rearward end to one of the forward disk frames 32—33 whereby upon oscillatory movement of the levers 138—138 the links 51 will oscillate the frames 32—33 to adjust the angular position of the disk gangs 38—39 in the operation of the harrow, as will be described.

Means is also provided in connection with the levers 45—45 and the crank 44 and nut 89 to adjust the angular positions of the rearward disk gangs, 63—64, relative to the forward disk gangs, and this mechanism performs also a compensating action. These parts and the dual functions thereof will now be described.

The levers 45—45 at a point between their pivot connection 46 and the nut housing 49, are joined at a pivot connection 52 with a connector 53, the axis of this pivot connection being horizontal, and to the connector 53 and on a vertical pivot 54, is connected the forward end of a compensating bar 55. The rearward end portion of the bar 55 is pivotally connected on a generally vertical axis at 56 to a head 57 mounted for longitudinal forward and rearward movement on the rear frame 27. The head 57 may conveniently embrace the rearward beam 28 and be slidable thereon, and the pivot connection at 56 may be made upon the upper side of the head.

Preferably the bar 55, for reasons to be referred to, is disposed a substantial distance from the beams 24 and 28 of the forward and rearward frames. This spaced relation at the forward end of the bar 55 is provided by the location of the pivot 52 on the levers 45—45; and at the rearward end of the bar 55 is provided an upwardly extending bracket 58, the upper end portion of the bracket being connected to the bar 55 and the lower end portion of the bracket being pivoted to the head 57 as described.

The forward connection 54 of the bar 55 is fixed longitudinally in any predetermined adjustment thereof on the frame. It follows therefore that when the implement as a whole is propelled forwardly out of a straight course and on a curved course, the hitch 26 on the forward frame correspondingly deflects the forward beam 24 out of the straight-ahead direction, moving it laterally, say from the position of Fig. 2 to that of Fig. 3, and the forward frame, supported upon the rolling disks 38 and 39, moves laterally around the pivot 29 relative to the rearward frame.

Figure 2:
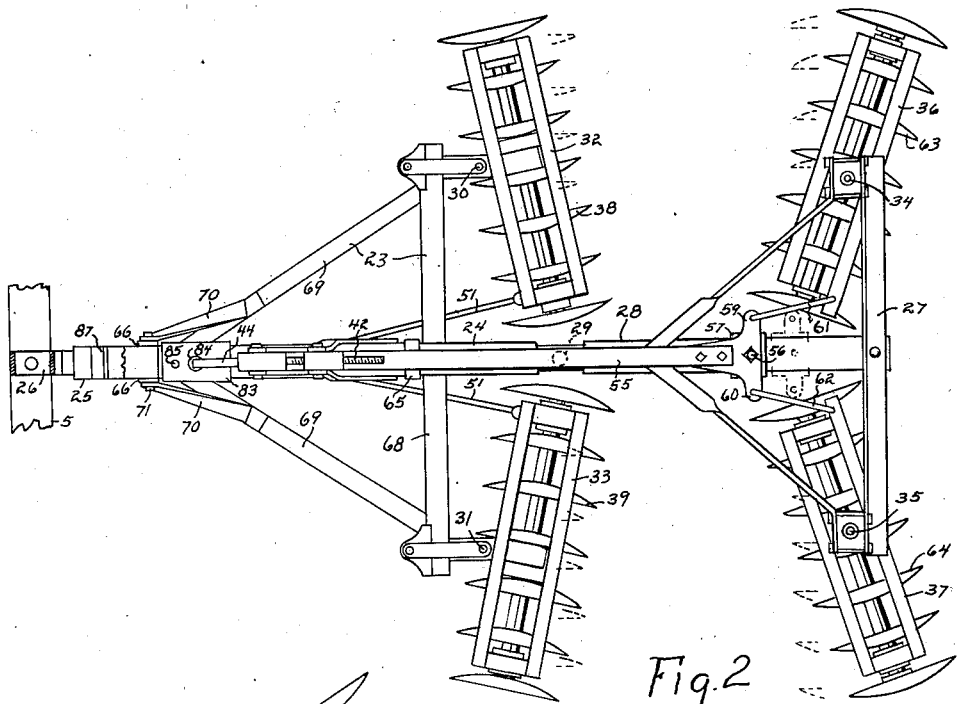
Fig. 2 is a top plan view of a tandem disk harrow embodying a part of my invention, and illustrating means for hitching it to the tractor of Fig. 1, a part of the hitch being broken away.
Figure 3:
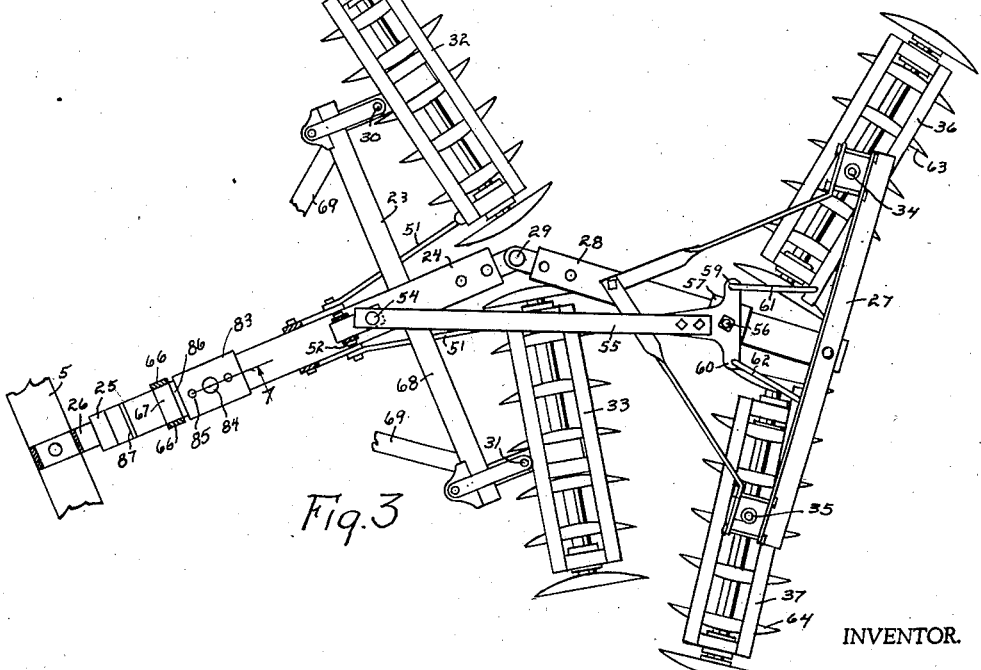
Fig. 3 is a view similar to Fig. 2 but illustrating the action of a compensating mechanism thereof upon propulsion of the harrow on a curved course.

The swinging of the forward frame around the pivot 29 causes the bar 55 to move the head 57 rearwardly on the beam 28 and also causes the bracket 58 to be rotated on its pivot 56, as will be observed in going from Fig. 2 to Fig. 3, and the bracket 58 therefore has a rearward movement concurrently with a rotating movement. This movement is communicated to the rear disk frames 36 and 37 through the links 61 and 62 with the result that the angular positions of the rear disc gangs is changed.

If the equivalent radius of the curved course is great, that is to say, if there is only a slight departure from the straight-ahead direction, the working angle of the rear disks 63 on the outer or convex side of the curved course, will be changed very little, and the angle of the disks 64 on the concave side of the course, will be changed to a marked degree; and if the curvature of the course is on a relatively small equivalent radius, the angle of both rear disk gangs will be changed to a marked degree; and in any case the angle of the discs on the concave side of the course will be changed more than that of the disks on the convex side of the course, and this will be true whether the rear disks have been adjusted as described to present no working angle to the direction of the course or whether they have been adjusted to an angle however great.

I have found it desirable to dispose the pivot 29 between the main frames, at such a position that vertical planes through the axes of rotation of the forward disk gangs will substantially intersect the axis of this pivot, when the forward disks are in the position of zero working angle. In Figs. 2 and 3 the pivot 29 is shown as slightly rearward of this intersection, to indicate that its precise location at the said intersection is not absolutely essential.

By the foregoing means it may be said in general that upon propelling the implement as a whole on a curved course, the working angle of the rearward disks on the convex side of the curve, will be decreased, and the angle of the disks on the concave side of the course increased, whereby the plowing or working angle with respect to the soil remains substantially the same as on the straightaway course, and that if the rearward disks are so mounted in the construction of the implement as to track or "split" with respect to the forward disks on a straight away course, they will substantially continue to do so on a curved course.

I have found that the mechanism above described will greatly improve the operation of the tandem disk harrow apart from the aforesaid improvement in maintaining splitting of the tracks of the forward disks by the rearward disks and in maintaining the plowing or working angle substantially the same on curved as on a straightaway. It is well known that in the operation of a tandem disk harrow, one of the two rear disk gangs at times develops greater draft than the other. There are numerous causes of this, among which may be mentioned the encountering of harder soil by one disc gang than by the other, and the working of one disk gang under load to work the soil, while the other disc gang is lightly loaded by overhanging a dead furrow, ditch, or the like.

In the conventional tandem disk harrow it is well known that if one rear disk gang develops more load than the other, the effect is to cause the rear main frame and both rear gangs to swing laterally and pivot around the intermediate king pin pivot, and this of course, changes the working angle of the rear disks and throws them out of tracking relation with the forward disks. With the mechanism above described, this lateral swinging of the frame is resisted or prevented by the following action.

Referring to Figs. 2 and 3 if a lateral swinging force is imposed upon the rear frame 27 by causes such as those referred to above, the rear frame will tend to swing laterally relative to the forward frame. Let it be assumed that the rear frame tends to swing downwardly as viewed in Fig. 2. Inasmuch as any such swinging movement will cause the head 57 to move rearwardly on the rear frame 27, the disk gang 63 will be rotated on the disk frame 27 around the pivot 34 causing the disks outwardly of the pivot 34 to be moved forward at an increased velocity equal to the sum of the implement velocity and the angular velocity of these outer disks around the pivot 34. This increased velocity increases the drag load of the disk gang 63 causing it to equal or balance the drag load of the disk gang 64 and therefore prevent or resist lateral shifting of the rear frame.

Again if the rear gang should encounter hard soil and should tend to ride up on the soil, the rear frame will tend to move vertically around the pivot 29 due to the unavoidable lost motion therein, but inasmuch as the bar 55 is spaced a substantial distance vertically above the forward and rear frames 23 and 27 as described above and which may be best seen in Fig. 4, any tendency for the rear gang to rise will put compression in the bar 55 which will resist the rising of the rear gangs and will tend to hold them in the ground.

In the foregoing is described the means for adjusting the angle of the rear gangs with respect to the forward gangs, and the compensating operation of the implement when propelled on curved courses. Means will now be described by which, by utilizing the aforesaid source of auxiliary power on the tractor, in conjunction with the draft power on the tractor, the disk gangs may be set to zero angle or to a working angle by power as referred to hereinbefore, and while the implement is being propelled by the tractor.

The sliding movement of the stub shaft 25 referred to is provided by a strap 65 of U-form secured as by welding at its open ends to opposite sides of the beam part 24 and looping over the stub beam 25, and forwardly thereof by a pair of uprights 66—66, secured as by welding to opposite sides of the beam 24, extending upwardly on opposite sides thereof, and having a bridging element 67 between and welded to the uprights and over the stub beam 25.

As stated hereinbefore the main frame 23 may be variously constructed but in the present instance I prefer to provide for supporting and bracing the pivots 30 and 31 of the forward disk gangs, a transverse angle bar 68, secured or welded to the beam 24, forwardly diagonally extending braces 69—69 welded or otherwise secured at their forward ends to the underside of the beam 24, and diagonal braces 70—70 secured at one end to the brace 69 and at their upper ends to the uprights 66; and the latter connection may be made by a bolt 71.

The aforesaid draft hitch 26 is secured as shown to the stub beam 25; and a supplemental hitch mechanism, now to be described, is connected to the lower beam 24, preferably on the bolt 71 at the upper portion of the uprights 66—66.

A connector 72 is pivoted on a horizontal axis on the bolt 71 and has connected thereto on a horizontal bolt 73, one end of a cable 74; an eye in the other end of which is connected to a link 75 to which are connected, by a bolt 76, a pair of bars 77—77. A series of holes 78 may be provided in the bar 75 whereby adjustment may be made the purpose which will be apparent. The outer ends of the bars 77—77 are pivotally connected by a vertical bolt 79 to diverging bars 80—80, the ends of which are pivoted on generally vertical axes to connectors 81—81 mounted on horizontal axes on the aforementioned arms 7—7'. The operation of this part of my invention will now be described.

As shown in Figs. 2 and 3, the pivots 34 and 35 for the rear disk gangs are nearer to their inner ends than their outer ends; and the pivots 30 and 31 for the forward gangs 32 and 33 are nearer to their outer ends than to their inner ends. When the gangs are propelled forwardly, the drag of the soil on the disks of the gangs, being unequalized on opposite sides of the pivots, causes the gangs to tend to rock on the pivots toward angular soil working positions. And such movement is allowed to take place as follows.

Upon applying forward draft to the hitch 26 by the tractor, and upon releasing power from the arms 7—7', the stub beam 25 is pulled forwardly, the parts moving from the positions of Fig. 5 to the positions of Fig. 4, as follows.

Figure 7:
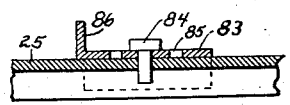
Fig. 7 is a longitudinal sectional view taken from the plane 7 of Fig. 3.

The forward draft on the stub beam 25 slides it on the beam 24 and moves with it the pivot 81 thereby rocking the levers 138—138 around the pivot 139 and, through the screw 42 and nut connection described, rocking the levers 45—45 around the pivot 46, both sets of levers moving counter-clockwise. The levers 138—138 move the links 51—51 rearwardly and allow the forward disc 38—39 to move to a working angle. The levers 45—45 exert tension on the bar 55 moving it forwardly and allowing the rear disks 63—64 to move to a working angle. The forward movement of the stub beam 25 relative to the beam 24 is stopped with the disks at any desired preselected angle by the following means. A saddle 83 is mounted on the upper side of the stub beam 25 by a bolt 84 projected through a perforation in the stub beam, see Fig. 7, and into one of a number of perforations 85—85 in the saddle 83; and the saddle has an upwardly extending flange 86 disposed in the path of the bridging element 67. The flange 86 is moved forwardly with the stub beam 25 and is stopped upon the element 67, thereby limiting the angular throw of the gangs effected by the draft, and this angular throw may be adjusted by taking the bolt 84 out of one perforation 85 and putting it into another, as will be apparent.

The gangs are now working the soil by the forward draft of the tractor. At any time, such as at making a turn at the end of the field, or upon going to and from the field, the gangs may be moved to no angle or zero angle position, and this is accomplished as follows.

The operator operates the valve 16 by the handle 17 as described in connection with Fig. 1, thereby rocking the arms 7 and 7' counter-clockwise as viewed in Figs. 1, 4 and 5, thereby exerting pull on the beam 24 through the pivot connection 71; and this pull moves the beam 24 forwardly relative to the stub beam 25; and the movement is transmitted through the pivot connection 139 to rock the levers 138—138 clockwise, around the pivot connection 81, and these levers acting through the rod 42 rock the levers 45—45 clockwise; and the clockwise movement of the levers oscillates the disk gangs on their pivots to position the disks at no angle or zero angle with the forward direction of travel; and the disks may automatically be stopped in this no angle position by a stop 87 on the stub beam 25 engaged by the bridging member 67 between the uprights 66.

Following this action whenever it is desired to again dispose the disks at a working angle, the power holding the arms 7—7' is released by the operator at the valve 16—17, and the drag of the disks will retard the forward movement of the beam 24, and the stub beam 25 will move forward relative thereto, and as described above this will set the gangs at the pre-selected angle position.

In order that the beam 24 will slide on the beam 25 without binding due to lateral or vertical thrust on the pivot 71, I provide the following means to insure that the direction of pull on the cable 74, at its point of connection 73, will be horizontal and parallel with the beam 24. This is particularly advantageous when the operative pull on the cable takes place while the tractor is propelling the implement on a curve. A pair of uprights 91—91 are mounted, for example by welding, on the upper side of the hitch 26 and extend upwardly therefrom in spaced apart relation, and connecting them is a forwardly and rearwardly diverging tube, the inner wall of which is longitudinally rounded. The cable passes through the tube, and the tube axis passes horizontally through the pivot connection 72. Forwardly of the tube, the cable, as at 74A, inclines upwardly; or as shown in Fig. 11 when the tractor is pulling the implement on a curve, the part 74A of the cable is bent laterally as well as upwardly; but in either instance, the pull exerted by the cable at the point 73 is horizontal, and in the direction parallel to the beams, so that they are caused to slide one on the other without lateral friction. The tube 92 is disposed sufficiently high so that the hitch bolt 93 may be raised sufficiently to withdraw it from the draw bar 5.

From the foregoing description it will now be apparent, that the frame of the implement, generally considered, comprises two elements, specifically the beams 25 and 24, movable longitudinally or forwardly and rearwardly one relative to the other; that forward draft applied to one of them will propel the implement as a whole; that the ground working tools of the implement are connected to the other of said elements and tend to move to ground working positions; that concurrently with forward propulsion draft on the said one element, if power is applied to the other of said elements, it moves relative to the said one element and its movement moves the ground working tool to non-ground-working positions, and while I have chosen to illustrate and describe a mechanism having these features in an implement of the disk harrow type, it will be apparent that it may be applied to other types of implements.

I have found that the movement of the disks to the angle position is facilitated if a compression spring 88 be provided, connected to the lower ends of the levers 138—138 and 45—45 as shown, tending to hold them apart; and while such spring is not essential to the operation of the implement, I prefer to employ it.

My invention is not limited to the exact details of construction illustrated and described. Changes and modifications may be made within the spirit of my invention without sacrificing its advantages.

My invention therefore is comprehensive of all such changes and modifications which come within the scope of the appended claims.

I claim:

1. In a tandem disk harrow implement, a forward and a rearward main frame connected together on an intermediate vertical hinging axis; a pair of forward gang frames and a pair of rearward gang frames; a gang of disks rotatably supported on each gang frame; said pairs of gang frames being pivotally supported for horizontal swinging movement on laterally opposite portions of the forward and rearward main frames respectively, to change the working angle of the disks; a draft hitch associated with the forward main frame and adapted to be connected to the draft bar of a tractor; adjustable means for predetermining the relative disk angles of the gang frames; interconnecting mechanism between the rearward gang frames and the forward gang frames to cause the former to take up a disk angle corresponding to that of the forward gang frames; said interconnecting mechanism comprising a sliding head on the rear main frame, a bar having a pivot connection with a portion of the adjustable means on a vertical axis forwardly of the aforesaid hinging axis and extending rearwardly beyond the hinging axis and connected to the head, and links connected to laterally opposite portions of the head and to the rearward gang frames, movable means for moving both gang frames to change their working disk angles and means for connecting the said movable means to an auxiliary power source.

2. In a tandem disk harrow implement, a forward and a rearward main frame connected together on an intermediate vertical hinging axis; a pair of forward gang frames and a pair of rearward gang frames; a gang of disks rotatably supported on each gang frame; said pairs of gang frames being pivotally supported for horizontal swinging movement on laterally opposite portions of the forward and rearward main frames respectively, to change the working angle of the disks; a draft hitch associated with the forward main frame and adapted to be connected to the draft bar of a tractor; adjustable means for predetermining the disk angles of the gang frames; interconnecting mechanism between the rearward gang frames and the forward gang frames to cause the former to take up a disk angle corresponding to that of the forward gang frames; said interconnecting mechanism comprising a sliding head on the rear main frame, a bar having a pivot connection with a portion of the adjustable means on a vertical axis forwardly of the aforesaid hinging axis and extending rearwardly beyond the hinging axis and connected to the head, and links connected to laterally opposite portions of the head and to the rearward gang frames; operable mechanism to adjustably move the bar pivot connection forwardly or rearwardly to adjust the disk angles of the rearward gang frames, and power operable mechanism to move both gang frames to change their working disk angles.

3. In a tandem disk harrow implement, a forward and a rearward main frame connected together on an intermediate axis; a pair of forward gang frames and a pair of rearward gang frames; a gang of disks rotatably supported on each gang frame; said pairs of gang frames being pivotally supported for horizontal swinging movement on laterally opposite portions of the forward and rearward main frames respectively, to change the working angle of the disks; a frame element movable relatively forward and rearwardly with respect to the forward main frame; a draft hitch connected to the movable frame element and adapted to be connected to the draw bar of a tractor; mechanism connecting the frame element to the forward gang frames and operable by the forward movement of the movable frame element, upon application of draft to the hitch, to pivotally move the forward gang frames to a working disk angle, adjustable means to predetermine the said disk angle; and interconnecting mechanism between the rearward gang frames and the forward gang frames to cause the latter to take up a disk angle corresponding to that of the forward gang frames, said interconnecting mechanism comprising a sliding head on the rear frame, and a bar having a pivot connection with a portion of the said mechanism on a vertical axis forwardly of the aforesaid hinging axis and the bar extending rearwardly beyond the hinging axis and being connected to the head, and links connected to laterally opposite portions of the head and to the rearward gang frames.

4. In a tandem disk harrow implement, a forward and a rearward main frame connected together on an intermediate vertical hinging axis; a pair of forward gang frames and a pair of rearward gang frames; a gang of disks rotatably supported on each gang frame; said pairs of gang frames being pivotally supported for horizontal swinging movement on laterally opposite portions of the forward and rearward main frames respectively, to change the working angle of the disks, a frame element guided for forward and rearward movement relative to the forward main frame; a hitch connected to the movable frame element and adapted to be connected to the draw-bar of a tractor; mechanism connecting the frame element to the forward gang frames and operable by forward movement of the movable frame element upon application of draft to the hitch to pivotally move the forward gang frames to a working disk angle; adjustable stop means to predetermine the said working angle; a connection on the forward main frame adapted to be connected to an auxiliary source of draft power on the tractor and operable thereby to move the main frame forwardly relatively to the movable frame element, and actuating said mechanism to move the forward gang frames to non-working disk angle; inter-connecting mechanism between the rearward gang frames and the forward gang frames to cause the former to take up a disk angle corresponding to that of the forward gang frames.

5. In a tandem disk harrow implement, a forward and a rearward main frame connected together on an intermediate vertical hinging axis; a pair of forward gang frames and a pair of rearward gang frames, a gang of disks rotatably supported on each gang frame; said pairs of gang frames being pivotally supported for horizontal swinging movement on laterally opposite portions of the forward and rearward main frames respectively, to change the working angle of the disks; a frame element movable relatively forwardly and rearwardly with respect to the forward main frame; a hitch connected to the movable frame element and adapted to be connected to the draw-bar of a tractor; mechanism connecting the frame element to the forward gang frames and operable by forward movement of the movable frame element upon application of draft to the hitch to pivotally move the forward gang frames to a working disk angle; adjustable means to predetermine the said working angle; a connection on the forward main frame adapted to be connected to an auxiliary source of power and operable thereby to move the main frames forwardly relatively to the movable frame element, and actuating said mechanism to move the forward gang frames to a substantially zero disk angle; interconnecting mechanism between the rearward gang frames and the forward gang frames to cause the former to take up a disk angle corresponding to that of the forward gang frames, said interconnecting mechanism comprising a sliding head on the rear frame, and a bar having a pivot connection with a portion of the aforesaid mechanism on a vertical axis forwardly of the aforesaid hinging axis, and the bar extending rearwardly beyond the hinging axis, and being connected to the head, and links connected to laterally opposite portions of the head and to the rearward gang frames.

6. In a tandem disk harrow, a forward main frame having means for propelling it over the ground; a rear main frame; the frames being connected together on a hinging axis intermediately thereof; a pair of laterally spaced disk frames pivotally connected to each main frame; a gang of disks rotatably supported on each disk frame; and the disks on the rear disk frame disposed to split the tracks of the disks of the forward disk frame; mechanism to change the angular position of the rear disk frames to cause their supported disks to substantially split the tracks of the disks of the forward disk frames upon a change of direction of forward movement of the forward frame; said mechanism being actuated by hinging movement of the forward frame relative to the rearward frame occurring upon said change of direction of the forward frame; said mechanism comprising a slider forwardly and rearwardly slidable upon the rear main frame, a head pivoted on the slider, and a bar connected to the head and pivotally supported by the forward main frame at a point forwardly of the said hinging axis, and links connected to the head at laterally opposite portions thereof and to the rear disk frames, and mechanism including a hitch for connection to a source of auxiliary power to cause auxiliary power to move the bar pivot and hinging axis closer together.

7. In a tandem disk harrow, a forward and a rearward frame, each pivotally supporting on its laterally opposite portions, a pair of gangs of rotatable disks, the rear frame being pivoted to the forward frame and on a vertical pivot axis intermediate of the forward and rearward gangs, a frame element provided with a tractor main draft hitch and associated with the frames and disk gangs to propel them, the said forward and rearward frames being mounted to move forwardly and rearwardly relatively to the said frame element, means to cause the forward and rearward gangs to move to working angle position upon occurrence of said rearward relative movement of the frames and to cause them to move to substantially no angle position upon occurrence of said forward relative movement of the frames, and means for effecting forward relative movement of the frames by an auxiliary draft power source on the tractor.

8. In a tandem disk harrow, a forward and a rearward frame, each pivotally supporting on its laterally opposite portions, a pair of gangs of rotatable disks, the rear frame being pivoted to the forward frame and on a vertical pivot axis intermediate of the forward and rearward gangs, a frame element provided with a tractor draft hitch and associated with the frames and disk gangs to propel them, the said forward frame being mounted to move forwardly and rearwardly relatively to the said frame element, means to cause the forward and rearward gangs to move to working angle position upon occurrence of said rearward relative movement of the frame and to cause them to move to substantially no angle position upon occurrence of said forward relative movement of the frame, said means comprising a connection between the frame element and the forward gangs and a connection from the rearward gangs to the frame element and means for effecting forward relative movement of the frame by an auxiliary draft power source on the tractor.

9. In a tandem disk harrow, a forward and a rearward frame, each pivotally supporting on its laterally opposite portions, a pair of gangs of rotatable disks, the rear frame being pivoted to a frame element associated with the forward frame and on a vertical pivot axis intermediate of the forward and rearward gangs, a draft element provided with a tractor draft bar hitch and associated with the frames and disk gangs to propel them, the said frame element being mounted to move forwardly and rearwardly relatively to the said draft element, means to cause the forward and rearward gangs to move to working angle position upon occurrence of said rearward relative movement of the frame element and to cause them to move to substantially no angle position upon occurrence of said forward relative movement of the frame element, said means comprising a connection between the frame element and the forward gangs and a bar connection from the rearward gangs to the draft element, and means to adjust the working angle of the rearward gangs relative to that of the forward gangs comprising means to adjust the effective length of said bar connection.

10. In a tandem disk harrow, a forward main frame having means for propelling it over the ground; a rear main frame; the frames being connected together on a hinging axis intermediately thereof; a pair of laterally spaced disk frames pivotally connected to each main frame; a gang of disks rotatably supported on each disk frame; and the disks on the rear disk frames disposed to split the tracks of the disks of the forward disk frames; mechanism to change the angular position of the rear disk frames to cause their supported disks to substantially split the tracks of the disks of the forward disk frames upon a change of direction of forward movement of the forward frame; said mechanism being actuated by hinging movement of the forward frame relative to the rearward frame occurring upon said change of direction of the forward frame; said mechanism comprising a slider forwardly and rearwardly slidable upon the rear main frame, a head pivoted on the slider, and a bar connected to the head and pivotally supported by the forward main frame at a point forwardly of the said hinging axis, and links connected to the head at laterally opposite portions thereof and to the rear disk frames.

11. In a tandem disk harrow, a forward and a rearward main frame connected together on an intermediate axis; a pair of forward gang frames and a pair of rearward gang frames; a gang of disks rotatably supported on each gang frame; said pairs of gang frames being pivotally supported for horizontal swinging movement on laterally opposite portions of the forward and rearward main frames respectively, to change the working angle of the discs; a pair of elements guided for sliding movement one relative to the other longitudinally of the implement; a main draft hitch connected to one of said elements for attachment to the main draft part of a tractor and means by which main draft power transmitted to said one element effects relative longitudinal movement of the said elements and thereby angles the front gang frames to working disc angle and propels the implement; and a supplemental draft hitch connected to the other of said elements for attachment to an auxiliary source of draft power on the tractor; and means by which supplemental draft power transmitted to said other element effects relative longitudinal movement of the said elements and moves the front gang frames to non-working disc angle; adjustable means on the forward main frame to stop relative movement of the frame elements to predetermine the said working disc angle; and interconnecting mechanism between the rearward gang frames and the forward gang frames to cause the latter to take up disk angles corresponding to those of the forward gang frames.

12. In combination, a tractor; an arm rockingly mounted on the tractor and having an arm portion movable in an upwardly convex arc, and the tractor having a rear axle and a power plant to propel the tractor and to rock the arm; a disk harrow comprising a frame pivotally connected to the tractor to be propelled thereby and to swing from side to side; the harrow having angularly adjustable disk gangs; a forwardly and rearwardly movable frame element; the gangs being pivotally supported on the frame so as to move to working angle position upon forward propulsion of the harrow and being connected to the movable element to move it concurrently rearwardly; a flexible connection extending upwardly and forwardly from the harrow in a direction above the rear axle and connecting the movable element to the arm portion; and moving the movable element forwardly to adjust the gangs to substantially non-angle position upon power-effected arcuate movement of the arm portion; and adjustably positionable stop means to limit rearward movement of the movable element to determine the gang angle.

13. In combination, a tractor; an arm rockingly mounted on the tractor and having an arm portion movable in an upwardly convex arc, and the tractor having a rear axle and a power plant to propel the tractor and to rock the arm; a disc harrow comprising a frame pivotally connected to the tractor to be propelled thereby and to swing from side to side; the harrow having angularly adjustable disc gangs; and having a rigid longitudinal bar element; a forwardly and rearwardly movable sliding element mounted on the bar element; the gangs being pivotally supported on the frame so as to move to working angle position upon forward propulsion of the harrow and being connected to the sliding element to move it concurrently rearwardly; a flexible connection extending upwardy and forwardly from the harrow in a direction above the rear axle and connecting the sliding element to the arm portion; and moving the sliding element forwardly to adjust the gangs to substantially non-angle position upon power-effected arcuate movement of the arm position; and adjustably positionable stop means to limit rearward sliding movement of the sliding element to determine the gang angle.

14. In a tandem disk harrow structure, a pair of forward gang frames and a pair of rearward gang frames; a gang of disks rotatably supported on each gang frame; said pairs of gang frames being supported for horizontal swinging movement to change the working angle of the disks; a pair of elements guided for sliding movement one relative to the other longitudinally of the implement; a main draft hitch connected to one of said elements for attachment to the main draft part of a tractor; and means by which the main draft power transmitted to said one element effects relative longitudinal movement of the said elements and thereby angles the front gang frames to working disk angle and propels the implement; and a supplemental draft hitch connected to the other of said elements for attachment to an auxiliary source of draft power on the tractor; means by which supplemental draft power transmitted to said other element effects relative longitudinal movement of said elements and moves the front gang frames to non-working disk angle; adjustable means to stop relative movement of the said elements to predetermine the said working angle; and interconnecting mechanism between the forward gang frames and the rearward gang frames to cause the latter to take up disk angles corresponding to those of the forward gang frames.

15. In a tandem disk harrow, a forward and a rearward pair of gangs of rotatable disks; a frame element associated with the gang frames and provided with a tractor auxiliary power draft hitch; a draft element provided with a tractor main draft hitch and associated with the disc gangs to propel them; the said frame element being mounted to move forwardly and rearwardly relative to the said draft element; the gangs being pivotally supported to swing to working angle position upon forward propulsion of the harrow by the main draft hitch, and means to cause the frame element to concurrently move rearwardly; means to move the disk gangs to substantially no-angle position upon the occurrence of forward movement of the frame element effected by auxiliary tractor draft; and means to determine the working angle of the disks comprising means to limit rearward movement of the said frame element.

16. In a tandem disk harrow, a forward main frame having means for propelling it over the ground; a rear main frame; the frames being connected together on a hinging axis intermediately thereof; a pair of laterally spaced disk frames pivotally connected to each main frame; a gang of disks rotatably supported on each disk frame; and the disks on the rear disk frames disposed to split the tracks of the disks of the forward disk frames; mechanism to change the angular position of the rear disk frames to cause their supported disks to substantially split the tracks of the disks of the forward disk frames upon a change of direction of forward movement of the forward frame; said mechanism being actuated by hinging movement of the forward frame relative to the rearward frame occurring upon said change of direction of the forward frame; said mechanism comprising a slider forwardly and rearwardly slidable upon the rear main frame, a head pivoted on the slider, and a bar connected to the head and pivotally supported by the forward main frame at a point forwardly of the said hinging axis, and links connected to the head at laterally opposite portions thereof and to the rear disk frames; and means to communicate tractor draft to the rear disk frames to effect forward and rearward movement of the rear disk frames relative to the pivot support of the bar to cause the said links to change the disk angle of the disk gangs of the rear disk frames.

17. In combination, a tractor; an arm rockingly mounted on the tractor and having an arm portion movable in an upwardly convex arc; and the tractor having a rear axle, and a power plant to propel the tractor and to rock the arm; a disk harrow frame pivotally connected to the tractor to be propelled thereby and to swing from side to side; the harrow having an angularly adjustable disk gang; the gang being pivotally supported on the frame to move to angle position upon propulsion of the harrow; the harrow frame comprising a rigid longitudinal bar element; gang angle adjusting means comprising a rigid sliding element mounted to slide forwardly and rearwardly on the harrow bar element and connected to the gang; a flexible connection extending upwardly and forwardly from the harrow in a direction above the rear axle and connecting the sliding element to the arm portion and moving the sliding element to adjust the gang to substantially non-angular position upon power effected arcuate movement of the arm portion; and adjustably positionable stop means to limit sliding movement of the sliding element to predetermine the gang angle.

18. In an agricultural implement for operation by a tractor having a rear axle and a power plant to propel the tractor and having a rockingly mounted auxiliary power operated arm a portion of which has arcuate movement in an upwardly convex arc above the level of the rear axle, an implement frame, a gang of ground working tools movably mounted on the frame, a hitch adapted to be connected to a main draft part of the tractor to propel the frame and the tools forwardly, the gang of tools being arranged to move to ground working positions upon application of propulsion tractor draft to the implement, the implement being provided with a supplemental hitch and an elongated connection for connecting it to the arcuately movable arm portion in an upwardly forwardly inclined direction over the rear axle, and means associated with the supplemental hitch guided to move forwardly longitudinally and move the tools to non-ground-working positions upon application of auxiliary power to the supplemental hitch through the elongated connection, and the supplemental hitch and associated means being retractable longitudinally, upon discontinuance of application of auxiliary power, by forward-propulsion-effected movement of the tools to ground working positions, and the elongated connection being flexible to accommodate the said longitudinal movement to the said arcuate movement.

19. In a disk harrow implement for operation by a tractor having a rear axle and a power plant to propel the tractor and having a rockingly mounted auxiliary power operated arm a portion of which has arcuate movement in an upwardly convex arc above the level of the rear axle, an implement frame, a gang of rotary ground working disks on the frame, a hitch adapted to be connected to a main draft part of the tractor to propel the frame and disk gang forwardly, the disk gang being arranged to move to ground working angle position upon application of propulsion tractor draft to the implement, the implement being provided with a supplemental hitch and an elongated connection for connecting it to the arcuately movable arm portion in an upwardly forwardly inclined direction over the rear axle, and means associated with the supplemental hitch guided to move forwardly longitudinally and move the disk gang to a non-ground-working angle position upon application of auxiliary power to the supplemental hitch through the elongated connection, and the supplemental hitch and associated means being retractable longitudinally upon discontinuance of application of auxiliary power, by forward-propulsion-effected movement of the disc gang to ground working angle position, and the elongated connection being flexible to accommodate the said longitudinal movement to the said arcuate movement.

20. In a disk harrow implement for operation by a tractor having an arm rockingly mounted on the tractor and a portion of which is arcuately movable in an upwardly convex arc, and the tractor having a rear axle, and a power plant to propel the tractor and to rock the arm in said arc upon application of power thereto; a disk harrow frame pivotally connected to the tractor to be propelled thereby and to swing from side to side; the harrow having an angularly adjustable disk gang; the gang being pivotally supported on the frame to move to angle position upon forward propulsion of the harrow; the harrow frame comprising a longitudinal bar element; gang angle adjusting means comprising a sliding element mounted to slide longitudinally on the harrow bar element and connected to the gang; an elongated connection for connecting the sliding element to the arcuately movable arm portion in a forward and upward direction above the rear axle for moving the sliding element longitudinally forwardly to adjust the gang to substantially non-angular position upon power effected arcuate movement of the arm in said arc; and the elongated connection being flexible to accommodate the said longitudinal movement of the sliding element to the said arcuate movement of the said arm portion; and the arm and sliding element being retractable by the said forward-propulsion-effected movement of the disk gang to angle position, upon discontinuance of the application of power to the arm.

21. In a tandem disk harrow implement, a frame; forward and rearward pairs of gangs of rotary soil engaging disks; each gang being pivotally connected to the frame on its own vertical pivot axis; each pivot axis being disposed nearer to one end than the other of its associated gang, to cause the gangs to be rotated on their axes to ground working angle positions upon forward propulsion of the implement, by soil drag on the disks, and to cause the forward gangs to rotate in one direction and the rearward gangs in the other direction; a draft hitch adapted to be connected to the draw bar of a tractor to propel the implement forwardly; a connection adapted to be connected to an auxiliary source of draft on the tractor; mechanism operable upon application of auxiliary draft to the said connection to cause the forward and rearward gangs to take up positions at substantially zero disk angle.

HAROLD R. McVICAR.